United States Patent [19]

Todd, Jr. et al.

[11] Patent Number: 4,955,629
[45] Date of Patent: Sep. 11, 1990

[54] COVERTIBLE CHASSIS FOR A SEMITRAILER

[76] Inventors: E. T. Todd, Jr., 13603 Sattler Rd., Jacksonville, Fla. 32226; John R. Shivar, 2806 DuPone Ave., Jacksonville, Fla. 32217

[21] Appl. No.: 400,386

[22] Filed: Aug. 30, 1989

[51] Int. Cl.⁵ ............................................. B62D 53/08
[52] U.S. Cl. ................................. 280/407; 280/407.1; 280/411.1; 280/418.1
[58] Field of Search ................. 280/405.1, 407, 407.1, 280/411.1, 438.1, 482, 149.1, 149.2, 418.1, 412

[56] References Cited

U.S. PATENT DOCUMENTS

| | | | |
|---|---|---|---|
| 3,374,010 | 3/1968 | Crockett | 280/418.1 |
| 4,365,820 | 12/1982 | Rush | 280/408 |
| 4,673,191 | 6/1987 | Arguin | 280/407.1 |

Primary Examiner—Charles A. Marmor
Assistant Examiner—Victor E. Johnson
Attorney, Agent, or Firm—Arthur G. Yeager

[57] ABSTRACT

Chassis for a semitrailer that is convertible to an elongated chassis to support both the semitrailer and a trailer towed behind the semitrailer; the chassis including three telescoping sections, two pairs of wheels, and a fifth wheel plate for the trailer.

20 Claims, 5 Drawing Sheets

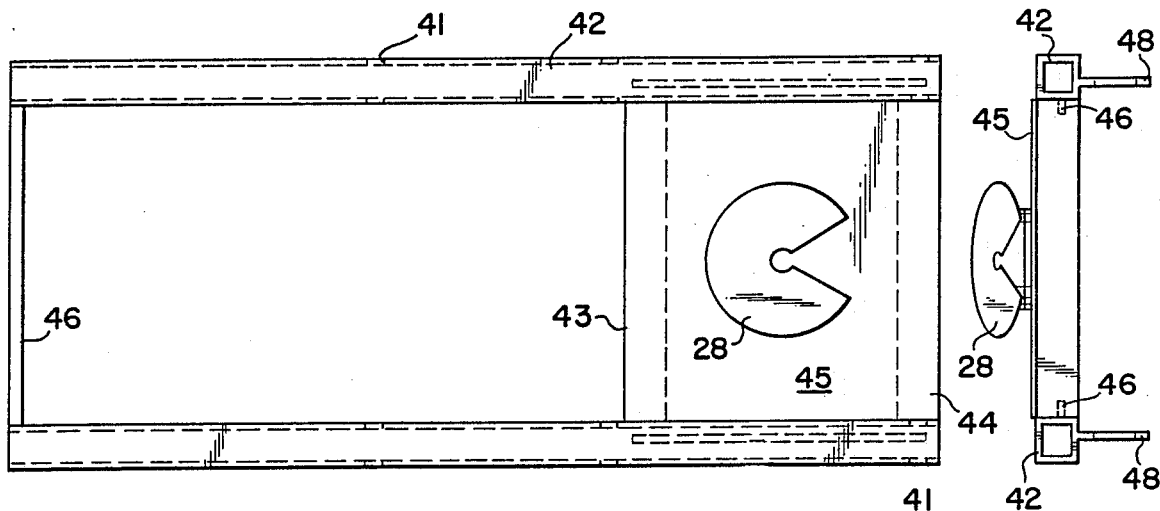
FIG 13
FIG 15
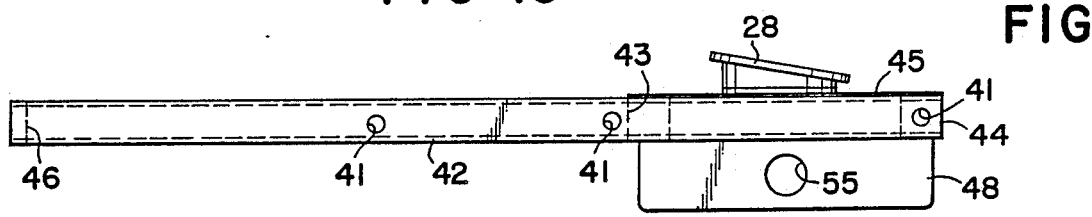
FIG 14
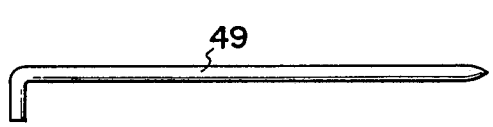
FIG 16
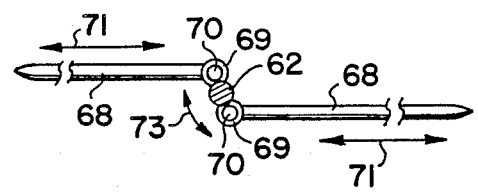
FIG 19
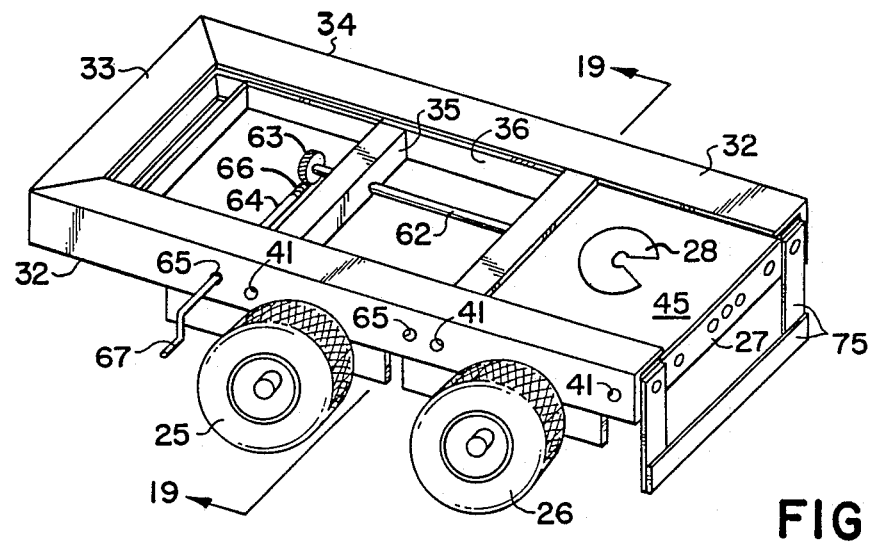
FIG 18

COVERTIBLE CHASSIS FOR A SEMITRAILER

BACKGROUND OF THE INVENTION

Freight trucks travelling on highways have been well known vehicles for many years, the larger of such trucks generally having the form of a tractor pulling a semitrailer and being connected thereto by the combination of a horizontal fifth wheel plate carried by the tractor and a king pin carried on the forward portion of the semitrailer. This truck arrangement, of course, permits a pivoting action about the fifth wheel to provide a facility for maneuvering the truck into small loading zones and a much shorter turning radius for the entire truck.

In more recent years the trucking industry, in seeking ways to carry more freight on each trip has experimented with the addition of a trailer attached to the rear of the semitrailer. A simple, free coupling between the semitrailer and the trailer is not satisfactory because there is no control over the towed trailer and the forward supporting wheels and axle are free to pivot and thereby to cause "jackknifing" and other linkage difficulties that can endanger the entire combination. Rigid connection arrangements between the semitrailer and the trailer are not acceptable because the truck is too long for desired maneuverability. Typical of such structures are U.S. Pat. Nos. 3,004,772; 3,102,738; 3,288,492; and 3,317,219. It was apparent that a second fifth wheel attachment between the semitrailer and the trailer was necessary. It is not feasible to have a fixed extension structure behind a semitrailer because that would interfere with the rear-en loading and unloading of the semitrailer which is important in being able to service loading docks built to load and unload a semitrailer from the rear. Hence, side loading and unloading has not been adopted, which otherwise would permit an extension from the rear to provide a second fifth wheel.

In general the prior art has attempted to solve this problem by providing a dolly, which is a short turn wheeled section carrying a fifth wheel plate on its upper surface and has means for a towing connection to the semitrailer ahead and will be connected to the trailer behind by means of the second fifth wheel. Such an arrangement is shown in U.S. Pat. No. 3,746,369 where the dolly is an independent vehicular section which is attached to the semitrailer when desired, and in U.S. Pat. No. 3,246,912 where the dolly is a part of the load carrying structure of the semitrailer but which can be detached to become the dolly section. In U.S. Pat. No. 3,374,010 there is shown a semitrailer with an extendible chassis to provide a means for coupling a trailer to a semitrailer through a fifth wheel connection. This arrangement, however, will not satisfy highway transportation laws because for normal loading there are not enough wheels to distribute the load properly. A single pair of wheels at the rear of the semitrailer is moved to support the front of the trailer and no wheels are left to support the rear of the semitrailer. Furthermore, in the normal case the semitrailer has two pair of rear wheels (two axles) and this patent does not provide for that arrangement. Generally, it would be expected that each of the semitrailer and the trailer would have a double axle arrangement at the rear of the vehicle.

It is an object of this invention to provide a convertible chassis for a semitrailer that can readily be extended to provide a chassis for both the semitrailer and a trailer towed behind the semitrailer. It is another object of this invention to provide a novel telescoping extendible chassis for attachment of a trailer to a semitrailer with an appropriate number and positioning of load bearing axles and wheels. Still other objects will become apparent from the more detailed description which follows.

BRIEF SUMMARY OF THE INVENTION

This invention relates to a convertible chassis for a semitrailer having two sides, a front, and an openable rear for access to inside space, a forward pair of wheels and a rearward pair of wheels mounted in spaced tandem relationship adjacent said rear, said chassis comprising:

(a) a main support section having a pair of parallel lengthwise main support beams positioned under and extending along said sides from said front to said back, and sufficient lateral main cross beams fastened to both said support beams to form a rigid main frame to support said semitrailer;

(b) an intermediate dolly having a generally rectangular rigid support frame slidable lengthwise telescopically within said main support beams and having attached thereto said forward pair of wheels, said dolly being slidable for a distance substantially equal to the distance between said forward pair of wheels and said rearward pair of wheels; with a first stop means to prevent said dolly from being slidable rearwardly beyond said rear of said main frame;

(c) a connector carriage to which is attached said rearward pair of wheels, and facing upwardly from said carriage a fifth wheel connector plate generally aligned with said rearward pair of wheels and midway between them;

(d) said connector carriage including a pair of parallel lengthwise carriage support beams slidable lengthwise telescopically within said dolly support frame and within said main support beams with a second stop means to permit said connector carriage to extend rearwardly of said rear of said main frame a distance suitable to permit attachment of a trailer to said semitrailer via said fifth wheel with a minimum of appropriate lengthwise spacing between said rear of said semitrailer and the forward portion of said trailer; and (e) means to selectively lock and unlock said main frame to said dolly and to said connector carriage to prevent or permit, respectively, mutual telescopic sliding movement thereamong.

In specific and preferred embodiments the lengthwise side beams of the two telescoping sections as well as the main frame are channel or hollow box beams which may be locked together to prevent lengthwise telescopic movement by the insertion of locking pins into aligned holes in the three sections at the fully collapsed arrangement or at the fully extended arrangement. Preferred stop means include a first means to stop the dolly section in its rearward extension at the desired location for the wheels carried by the dolly section; and a second means to stop the rearward extension of the carriage connector section at the appropriate location for attaching the connector section to the trailer. Another preferred embodiment provides means for independently releasing the brakes on the wheels of the dolly section while keeping the brakes on the wheels of the carriage connector section.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 13 is a top plan view of the carriage connector section (excluding the axle and wheels) of the chassis of this invention;

FIG. 14 is a side elevational view of the carriage connector section (excluding the axle and wheels) of the chassis of this invention;

FIG. 15 is a rear elevational view of the carriage connector section (excluding the axle and wheels) of the chassis of this invention;

FIG. 16 is a side elevational view of a locking pin used in this invention;

FIG. 17 is a cross sectional view taken at 17—17 of FIG. 4;

FIG. 18 is a perspective view of the chassis of this invention equipped with a special locking pin mechanism; and FIG. 19 is a cross sectional view of the locking pin mechanism taken at 19—19 of FIG. 18.

DETAILED DESCRIPTION OF THE INVENTION

The invention and its features are best understood by reference to the attached drawings.

Figure 1:
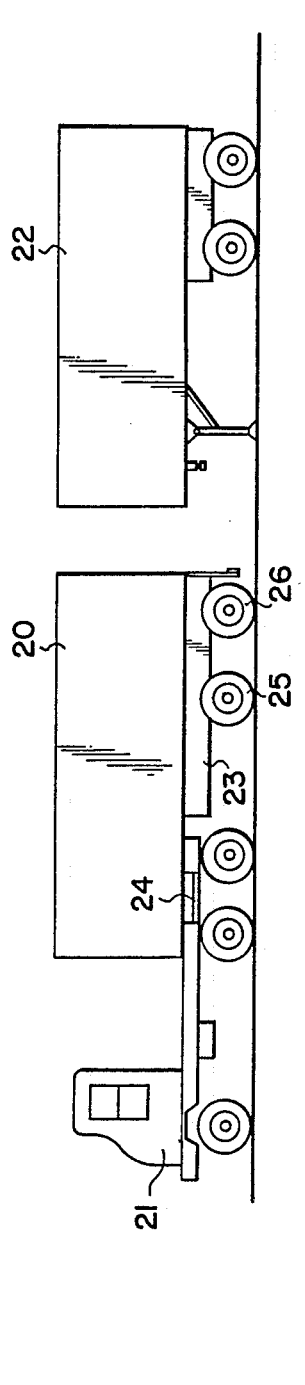
FIG. 1 is a schematic side elevational view of a tractor, semitrailer, and trailer to be joined by the apparatus of this invention.
Figure 2:
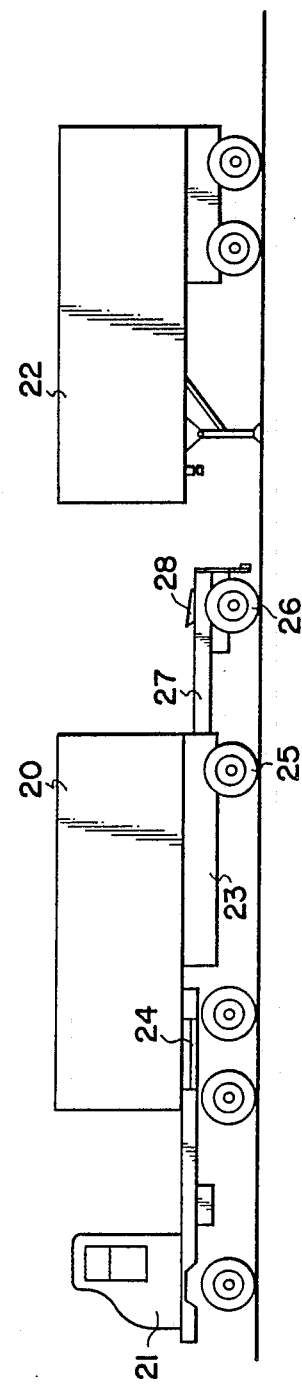
FIG. 2 is a schematic side elevational view of the tractor and semitrailer with the apparatus of this invention extended for use in attaching the trailer thereto.
Figure 3:
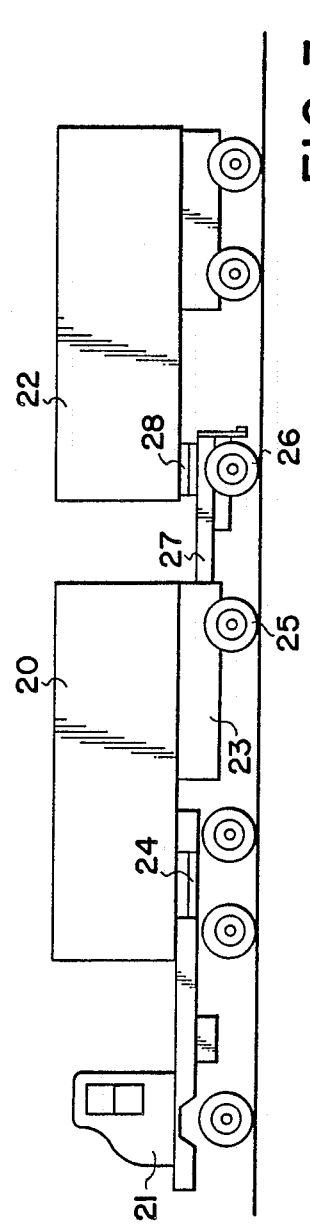
FIG. 3 is a schematic side elevational view of a tractor, semitrailer, and trailer joined together by the apparatus of this invention.

FIGS. 1-3 illustrate the general positions and use of the chassis of this invention. A tractor 21 and a semitrailer 20 are joined together operatively by a first fifth wheel assembly 24 with the semitrailer 20 riding on a front pair of wheels 25 and a rear pair of wheels 26 attached to semitrailer 20 at the chassis 23. It is desired to attach trailer 22 to the rear of semitrailer 20 so as to provide extra space for carrying freight. In accordance with this invention chassis 23 is designed to be extendible to the rear so as to expose carriage connector section 27 on which is mounted a second fifth wheel plate 28. The driver of the tractor 21 backs semitrailer 20 into the position shown in FIG. 1, unlocks the telescopic chassis members from the semitrailer 20, causes wheels 26 to have their brakes engaged and wheels 25 to have their brakes released, and drives tractor 21 and semitrailer 20 forward causing chassis 23 to extend as shown in FIG. 2. After locking the chassis in the extended position and releasing brakes, tractor 21 and semitrailer 20 are backed into connecting engagement with trailer 22 with second fifth wheel 28 locked in the operating connection for the driver to proceed with semitrailer 20 immediately behind tractor 21, and trailer 22 towed behind semitrailer 20.

Figure 4:
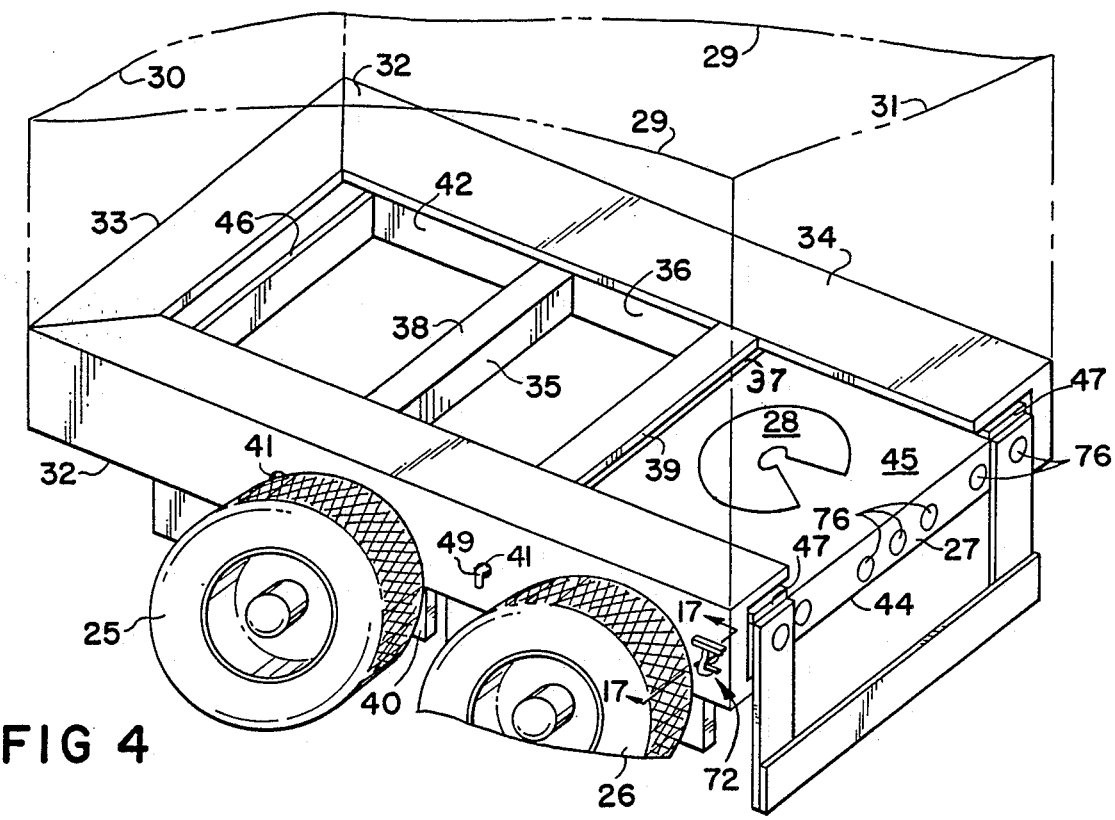
FIG. 4 is a perspective view of the semitrailer chassis of this invention in the collapsed or closed position.
Figure 5:
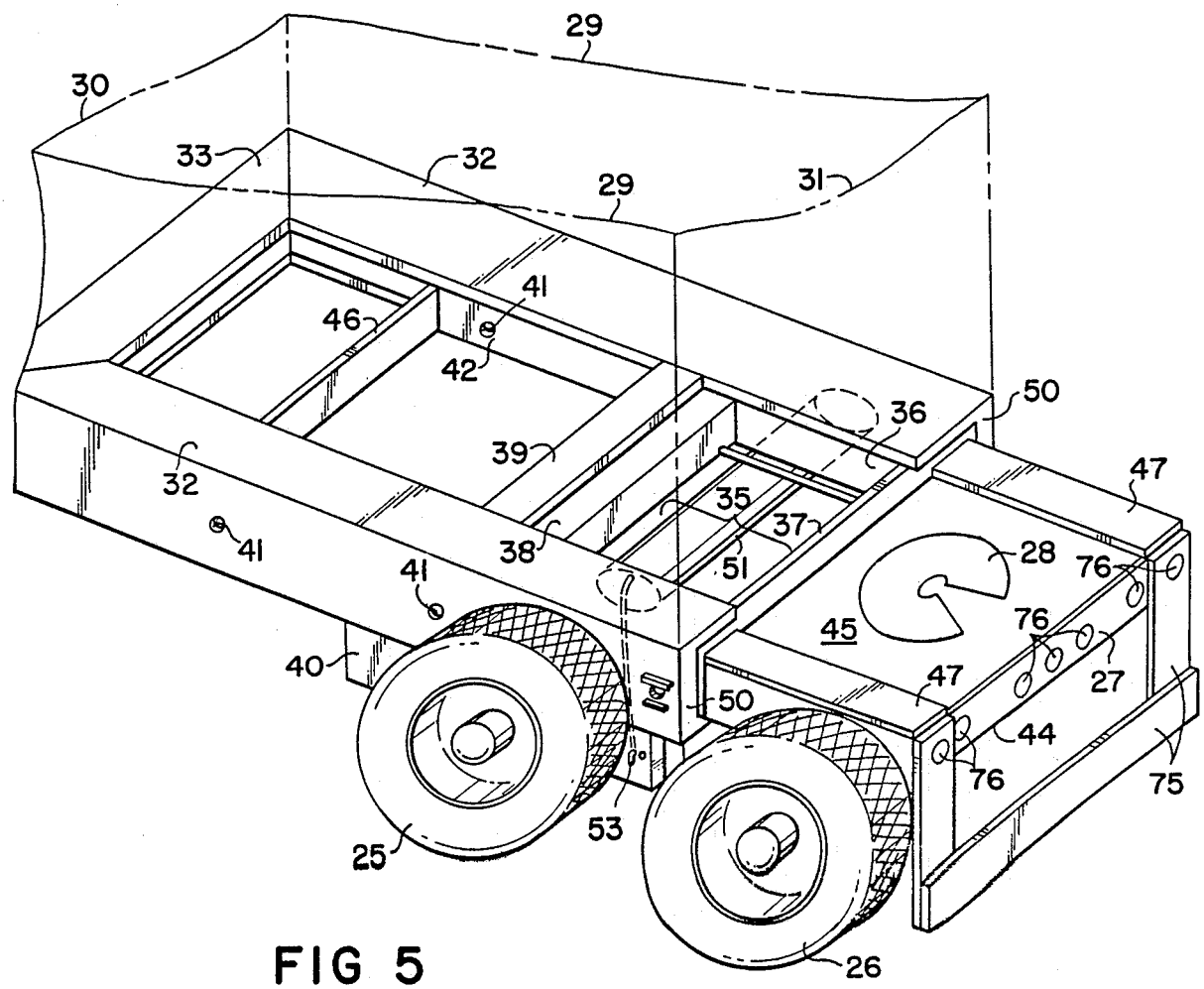
FIG. 5 is a perspective view of the semitrailer chassis of this invention in the partially extended position.
Figure 6:
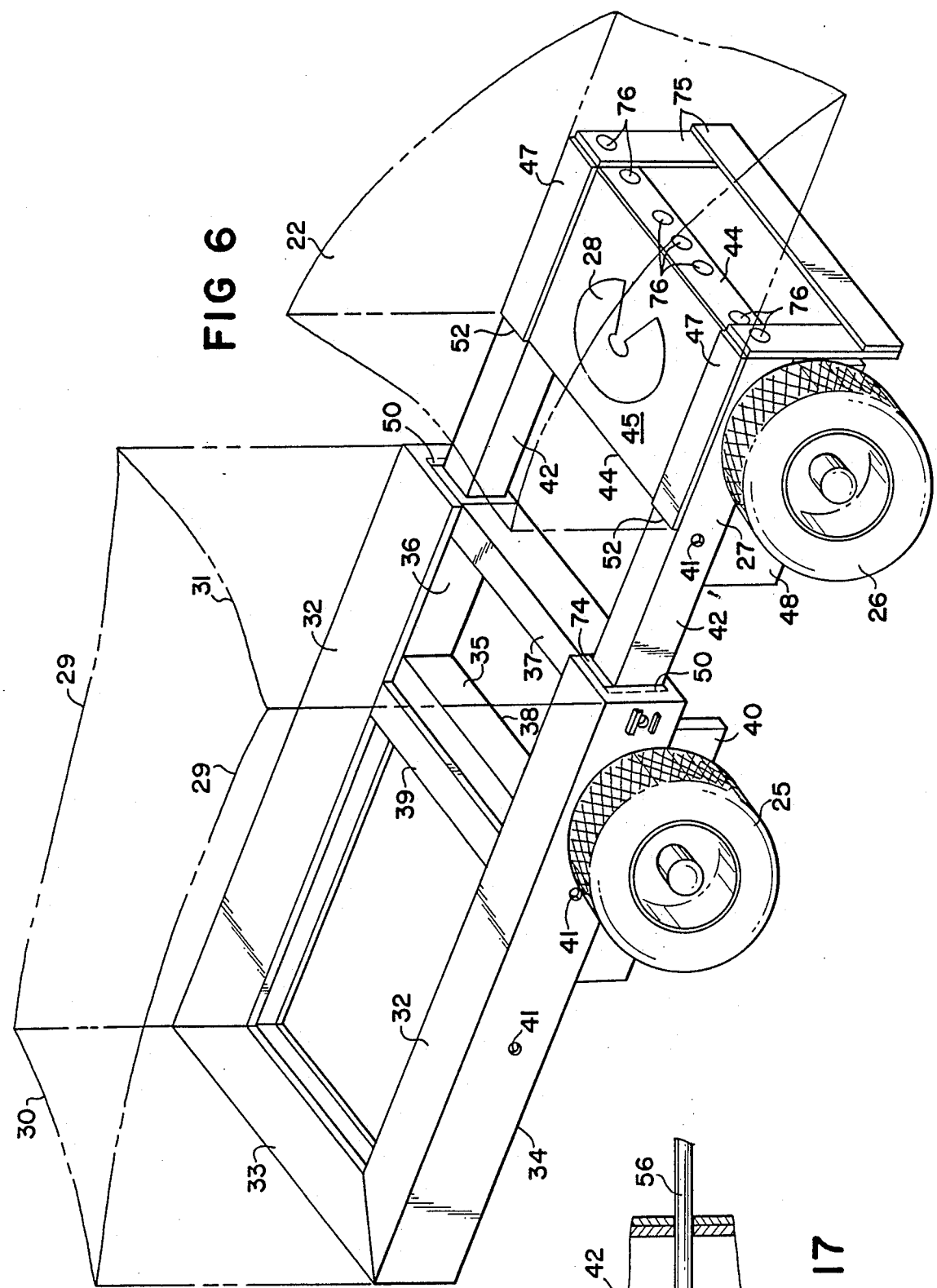
FIG. 6 is a perspective view of the semitrailer chassis of this invention in the fully extended position.
Figure 7:
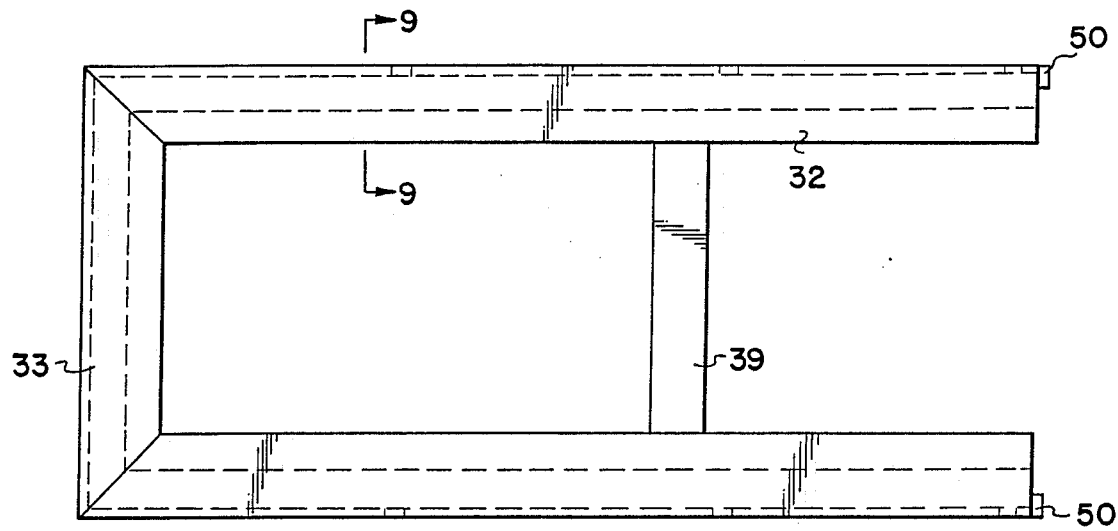
FIG. 7 is a top plan view of the main support section of the chassis of this invention.
Figure 8:
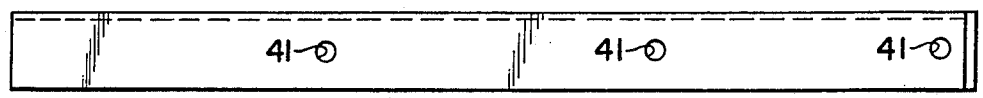
FIG. 8 is a side elevational view of the main support section of the chassis of this invention.
Figures 9, 10, 12:
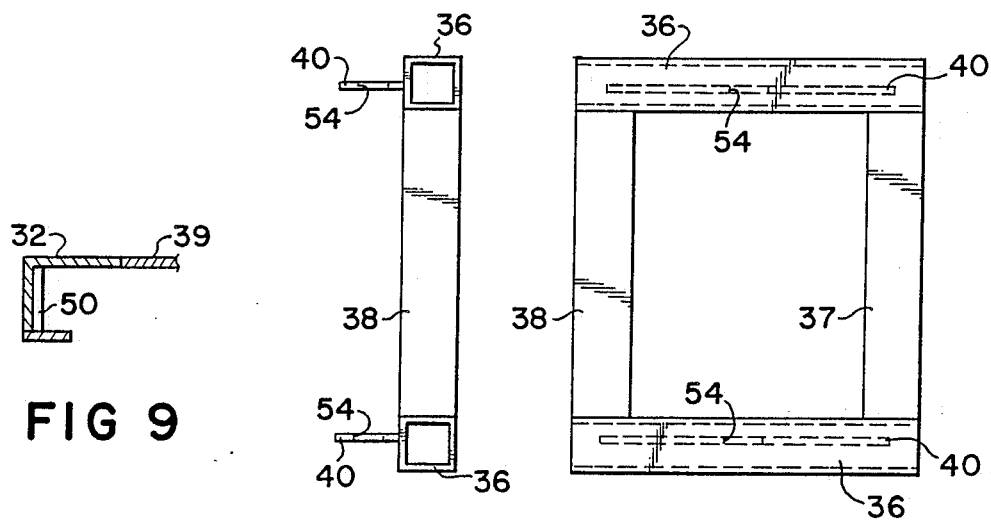
FIG. 9 is a cross sectional view taken at 9—9 of FIG. 7.
FIG. 10 is a top plan view of the intermediate dolly section (excluding the axle and wheels) of the chassis of this invention.
FIG. 12 is a front elevational view of the intermediate dolly section (excluding the axle and wheels) of the chassis of this invention.
Figure 11:
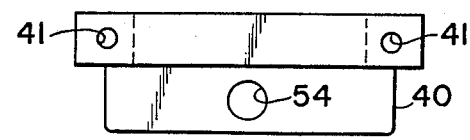
FIG. 11 is a side elevational view of the intermediate dolly section (excluding the axle and wheels) of the chassis of this invention.

In FIGS. 4–6 there are shown the different positions assumed by the chassis assembly 23 from a fully collapsed or closed position (FIG. 4) to a partially extended position (FIG. 5) and to a fully extended position (FIG. 6). FIGS. 7–14 show the preferred structure of the three sections of chassis 23 and should be considered along with the following description of FIGS. 4–6.

Chassis 23, insofar as it relates to this invention, is composed of three telescopically slidable sections; namely, main support section 34, intermediate dolly section 35, and carriage connector section 27. Main support section is stationary and supports the side walls 29, the front wall 30, and the rear wall 31 of the semitrailer, inside of which is a large freight containing space. Generally, access to the internal space of semitrailer 20 is gained by opening an access door or doors in rear wall 31. Such doors may be hinged vertically or horizontally, neither of which having any relevance to the present invention and so such doors are not shown on these drawings. The semitrailer may have one or more access doors in side walls 29 in addition to or in place of the access door or doors in rear wall 31, and such side wall access is immaterial to the utility of the present invention. Main support section 34 serves as the outer base section into which sections 35 and 27 can be collapsed and hidden and out of which sections 35 and 27 may be extended.

Intermediate dolly section 35 serves to support forward pair of wheels 25 and related axle and suspension structures (which are standard prior art components and not shown here). A general wheel supporting structure 40 is shown merely to indicate that some structure is needed to support a pair of wheels 25, with or without a common axle. Other wheel suspension components such as springs, shock absorbers, brakes etc. are not shown for simplicity sake, but would be included in any operational version of this invention.

The supporting structure of dolly section 35 includes two parallel side beams 36, a front cross beam 38 and a rear cross beam 37. Preferably all beams 35-38 are channel beams or hollow box beams which are sized to slide lengthwise within beams 32 of main support section 34 and to permit beams 42 of connector carriage section 27 to slide lengthwise therewithin. Intermediate dolly section serves principally to move forward wheels 25 from the forward position as shown in FIGS. 1, 4, and 5 to the rearward position (when the chassis 23 is extended) as shown in FIGS. 2, 3, 5 and 6. When wheels 25 are moved to the rearward position they assume the same general position as wheels 26 in the closed position of FIGS. 1 and 4. This provides for a proper distribution of load bearing wheels when trailer 22 is attached.

In the undercarriage of dolly section 35 is an air cylinder 51 which supplies compressed air to the brakes of wheels 25 as controlled by the driver. When chassis 23 is to be extended for attachment to trailer 22 one step in the procedure, as described above, is to release the brakes of wheels 25 while keeping the brakes set on wheels 26, permitting the tractor 21 and semitrailer 20 to move forward and to extend the telescoping chassis sections 27 and 35. This arrangement of the brakes may be accomplished by manually opening valve 53 connected to tank 51 to bleed off the compressed air. Other more complicated arrangements can be employed through controls in tractor 21 so long as the brakes on wheels 25 and 26 are individually controllable.

The connector carriage section is the innermost of the three telescoping sections 27, 34 and 35; and the one that extends farthest to the rear. This section 27 serves two purposes of supporting rear wheels 26 and of supporting fifth wheel plate 28. The structure of connector carriage section 27 includes two elongated parallel side beams 42, a beam 43, a rear cross beam 44, and a support plate 45 on which fifth wheel plate 28 is mounted. Rear cross beam 44 normally also supports a beam structure 75 and a series of operating lights (directional signals, stop lights, backup lights, etc.) 76. Wheels 26 are supported underneath carriage section 27 at its rearward end generally under and aligned with plate 28 to provide optimum support for the forward portion of trailer 22. Wheels 26 are supported by a suitable structure shown here as 48, but, as described above with respect to dolly section 35, wheels 25, and wheel support structure 40, it will include the usual components of springs, shock absorbers, axle, brakes, etc., none of which is a part of this invention. Beams 42 are shown as box beams sliding inside of box beams 36 of dolly section 35, although one or both of beams 36 and 42 may be channels if they are shaped to permit mutual sliding movement lengthwise. On top of the rearward portion of beams 42 are stop plates 47. As beams 42 are telescoped forward into side beams 36 of dolly section 35 the forward edge 52 of stop plates 47 will contact the rearward edge 74 of beams 36 and prevent any further forward movement of beams 42 with respect to beams 36. At the extreme forward ends of beams 42 is a stop beam 46 extending laterally across the forward ends of beams 42 so as to engage the forward cross beam 38 when connector carriage section 27 is moved rearwardly, and to prevent any further rearward movement of beams 42 with respect to beams 36. It may be appreciated therefore that in the collapsing of chassis 23 stop plates 47 push dolly section 35 forward and carriage section is stopped when the forward ends of beams 42 contact forward support beam 33 of main support section 34, although carriage section 27 and dolly section 35 will not be permitted to move to the forward extremity of possible travel, but rather will be stopped short of that position and locked in place as will be described below. When the chassis 23 is to be extended, stop beam 46 engages the forward extremities of beams 36 of dolly section 35, pulling section 35 to the rear until the rearward edge 74 of beams 36 contact stop flange 50 on side beams 32 of main support section 34. This will also stop any farther rearward extension of carriage section 27 because stop beam 46 is in contact with the rear of dolly section 35.

The remaining features of the chassis of this invention relate to the capability to lock telescopic sections 27, 34 and 35 to prevent any and all mutual sliding movement among these sections. There are only two positions which require locking; namely, fully closed (see FIG. 4) and fully extended (see FIG. 6). Locking is accomplished preferably by a sliding bolt or rod through aligned holes in the three sections 27, 34 and 35. The holes are shown as 41 on the drawings and they line up with the centerline, or near the centerline, of cross beams 37 and 38 of dolly section 35. When chassis 23 is fully collapsed (see FIG. 4) there are two sets of aligned holes 41 that pass through beams 32, 36 and 42, generally also aligned along the centerline of beams 37 and 38 of dolly section 35. When chassis 23 is fully extended (see FIG. 6) there are two sets of aligned holes 41 that pass through beams 32, 36, and 42, generally also aligned along the centerlines of beams 37 and 38. There are three positions for hole 41 in beams 32 (see FIGS. 7 and 8) and three similar positions for holes 41 in beams 42 (see FIGS. 13 and 14). Dolly section 35, however, only needs two sets of holes 41 (see FIGS. 10 and 11). This means that one of holes 41 in beams 32 and 42 is used in both the fully collapsed and the fully open positions; and that is the central hole 41 in each of beams 32 and 42. In the fully collapsed position the forward and central holes 41 in beams 32 and 42 will align with beams 37 and 38 of dolly section 35. In the fully extended position the rearward and central holes 41 will align with beams 37 and 38 in dolly section 35.

Locking pins 49 to be used in holes 41 may be sufficiently long to reach laterally from the outside of one beam 32 to the outside of the other beam 32, thus requiring two such elongated pins 49 to lock chassis 23 in either the fully collapsed or the fully extended position. Another embodiment is to use twice as many, i.e., four short locking pins 49 that are each only long enough to extend from the outside of one beam 32 to and through the inside of beam 42 (which will also pass through beams 36). Two of the short pins 49 must be pushed into the appropriate holes 41 on each side of chassis 23 to lock the chassis 23 in place.

FIG. 17 shows a preferred embodiment for manual pins 49 as described above whether they are long enough to reach completely across chassis 23 or only long enough to pass through beams 32, 36, and 42 on one side of chassis 23. The embodiment of FIG. 17 provides a keeper arrangement to prevent a locking pin 49 from coming loose by vibration and falling out of holes 41 inadvertently. Pin 56 is fully equivalent to pin 49 in passing through and engaging holes 41. At the outer end of pin 56 is a handle 58 pivoted at 57 through a spring biased means to keep handle 58 generally at a right angle to pin 56. Handle 58 can be pivoted outwardly in the direction of arrow 61 to free handle 58 from cover 60 and from friction ledge 59. Once freed from cover 60 and ledge 59, handle 58 can be pulled to release pin 56 from holes 41.

In FIGS. 18 and 19 there is shown a more complicated, but more convenient device for the tractor driver to release or to insert locking pins (49 or 56) into holes 41. In this arrangement all pins (49 or 56) are pushed into or pulled out of aligned holes 41 from the center of chassis 23 rather than from the outside. A central lengthwise shaft extends through beams 37 and 38 to pins 68 inside beams 37 and 38 which can be extended laterally to be inserted into or retracted laterally to be removed from holes 41 in either position (closed or extended) of chassis 23. When shaft 62 is rotated in the direction of arrow 73 about its axis, levers 69 containing pivots 70 connected to pins 68 caused pins 68 to move outward or inward in the direction of arrows 71. Shaft 62 is rotated by means of gear 63 being turned by the action of worm gear 66 on control rod 64 extending outwardly to an access opening 65 through which crank handle 67 may be inserted to be connected to rod 64 by any suitable coupling, e.g., a square head on handle 67 mating with a square socket on rod 64. There, of course, must be two holes 65, one for each position of dolly section 35 when chassis 23 is collapsed or extended.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. Convertible chassis for a semitrailer having two sides, a front, and an openable rear for access to inside space, a forward pair of wheels and a rearward pair of wheels mounted in first spaced tandem relationship adjacent said rear when chassis is in a retracted position, said chassis comprising:
   (a) a main support section having a pair of parallel lengthwise main support beams positioned under and extending along said sides from said front to said back, and sufficient lateral main cross beams fastened to both said support beams to form a rigid main frame to support said semitrailer;
   (b) an intermediate dolly having a generally rectangular rigid support frame slidable lengthwise telescopically within said main support beams and having attached thereto said forward pair of wheels, said dolly being slidable for a distance substantially equal to the distance between said forward pair of wheels and said rearward pair of wheels in said first spaced tandem relationship; with a first stop means to prevent said dolly from being slidable rearwardly beyond said rear of said main frame;
   (c) a connector carriage to which is attached said rearward pair of wheels, and carriage a fifth wheel connector plate facing upwardly from said generally aligned with said rearward pair of wheels and midway between them;
   (d) said connector carriage including a pair of parallel lengthwise carriage support beams slidable lengthwise telescopically within said dolly support frame and within said main support beams with a second stop means to permit said connector carriage to extend rearwardly of said rear of said main frame a distance suitable to permit attachment of a trailer to said semitrailer via said fifth wheel with a minimum of appropriate lengthwise spacing between said rear of said semitrailer and the forward portion of said trailer; and
   (e) means to selectively lock and unlock said main frame to said dolly and to said connector carriage to prevent or permit, respectively, mutual telescopic sliding movement thereamong.

2. The convertible semitrailer of claim 1 wherein said lengthwise main support beams are channel beams, and said support frame of said dolly that is telescopically slidable within said main support beams are hollow box beams.

3. The convertible semitrailer chassis of claim 1 wherein said first stop means is a laterally extending member attached to the rear of said main support beams structured and adapted to engage said dolly frame and prevent any sliding movement of said dolly frame rearwardly beyond said member.

4. The convertible semitrailer chassis of claim 1 wherein said second stop means includes a laterally extending member attached to the forward end of said carriage support beams structured and adapted to engage the forward portion of said dolly frame and as said connector carriage is moved rearwardly, to urge said dolly frame rearwardly to engage said first stop means.

5. The convertible semitrailer chassis of claim 1 which additionally comprises means to independently release the brakes on said forward pair of wheels while maintaining the brakes on said rearward pair of wheels.

6. The convertible semitrailer chassis of claim 1 wherein said means to lock and unlock includes rod members insertable into aligned holes through said main support frame, said dolly frame, and said carriage support beams so as to prevent any longitudinal sliding movement of said frames and said beams.

7. The convertible semitrailer chassis of claim 6 wherein each said rod member engages both said main support beams, said dolly frame, and both said carriage support beams.

8. The convertible semitrailer chassis of claim 6 wherein each said rod member extends only through one said main support beam and one said carriage support beam.

9. The convertible semitrailer chassis of claim 6 which additionally comprises a longitudinal control shaft structured and adapted to be selectively axially rotated; said shaft being connected by pivot and lever means to said rod members so as to engage or disengage said rod members in said aligned holes as said shaft is rotated.

10. The convertible semitrailer chassis of claim 2 wherein said carriage support beams are square box beams slidable within said hollow box beams of said dolly.

11. Convertible chassis for a forward semitrailer to couple a rearward semitrailer thereto comprising an elongated main support section having a pair of parallel lengthwise main support beams positioned under and extending along respective sides of a forward semitrailer when the chassis is in a initial retracted position, a plurality of spaced lateral cross beams fastened to each of said support beams to form a rigid main frame to support a forward semitrailer, an intermediate dolly having a generally rectangular rigid support frame slidable lengthwise telescopically within said main support beams, a forward pair of wheels being suspended from said intermediate dolly, said intermediate dolly being slidable for a distance substantially equal to the distance between said forward pair of wheels and a rearward pair of wheels forming the rearmost wheels of a forward semitrailer, a first stop means between said main frame and said intermediate dolly to prevent said dolly from being slidable rearwardly beyond the extent of said main frame, a connector carriage having a pair of parallel lengthwise carriage support beams slidable lengthwise telescopically within said dolly support frame, said rearward pair of wheels being suspended from said connector carriage, a fifth wheel connector plate attached to and extending upwardly from said connector carriage and being generally aligned with said rearward pair of wheels and disposed generally medially therebetween, a second stop means to permit said connector carriage to extend rearwardly of rearward extent of said main frame a predetermined distance to dispose said fifth wheel below and attached to a rearward semitrailer with sufficient lengthwise spacing between a forward and rearward semitrailer, and means to selectively lock and unlock said main frame to said dolly and to said connector carriage to selectively prevent or permit, respectively, mutual telescopic sliding movement thereamong.

12. The convertible chassis of claim 11 wherein said lengthwise main support beams are channel beams, and said support frame of said dolly including a pair of spaced elongated hollow box beams telescopically slidable within respective said channel beams.

13. The convertible chassis of claim 11 wherein said first stop means includes a laterally extending member attached to the rear of said main support beams and selectively engaged with said dolly frame to prevent any sliding movement of said dolly frame rearwardly beyond said laterally extending member.

14. The convertible chassis of claim 11 wherein said second stop means includes a laterally extending member attached to the forward ends of said carriage support beams and selectively engaged with the forward portion of said dolly frame and as said connector carriage is moved rearwardly, to urge said dolly frame rearwardly to engage said first stop means.

15. The convertible chassis of claim 11 which additionally comprises means to independently release the brakes on said forward pair of wheels while maintaining the brakes on said rearward pair of wheels to cause said chassis to assume its fully extended position.

16. The convertible chassis of claim 11 wherein said means to lock and unlock includes rod members insertable into aligned holes through said main support frame, said dolly frame, and said carriage support beams so as to prevent any longitudinal sliding movement of said frames and said beams in its fully extended or fully collapsed position.

17. The convertible chassis of claim 16 wherein each said rod member engages both said main support beams, said dolly frame, and both said carriage support beams.

18. The convertible chassis of claim 16 wherein each said rod member extends only through one said main support beam and one said carriage support beam.

19. The convertible chassis of claim 16 which additionally comprises a longitudinal control shaft extending generally parallel to said main support beams and being rotatively supported by said dolly support frame, lever means connecting said shaft to said rod members for selective movement thereof to cause said rod members to engage within or disengage from said aligned holes as said shaft is rotated in respective directions.

20. The convertible chassis of claim 19 wherein said dolly support frame includes a pair of spaced lateral beams, said shaft being connected to said lateral beams, said rod members extending generally parallel to said lateral beams adjacent respective said lateral beams, said rod members respectively locking into a pair of holes located on each side of said forward set of wheels and being spaced a predetermined distance when said chassis is in its fully collapsed position, said rod members respectively locking into a rearward hole of said pair of holes and another hole located and spaced rearwardly said predetermined distance from said rearward hole when said chassis is in its fully extended position.

* * * * *